United States Patent
Xu

(10) Patent No.: US 9,290,652 B2
(45) Date of Patent: Mar. 22, 2016

(54) THERMOPLASTIC ELASTOMER COMPOUNDS EXHIBITING SHAPE MEMORY VIA THERMO-MECHANICAL ACTION

(75) Inventor: Liang Xu, Buffalo Grove, IL (US)

(73) Assignee: PolyOne Corporation, Avon Lake, OH (US)

( * ) Notice: Subject to any disclaimer, the term of this patent is extended or adjusted under 35 U.S.C. 154(b) by 80 days.

(21) Appl. No.: 14/122,298

(22) PCT Filed: May 30, 2012

(86) PCT No.: PCT/US2012/039966
§ 371 (c)(1),
(2), (4) Date: Nov. 26, 2013

(87) PCT Pub. No.: WO2012/166782
PCT Pub. Date: Dec. 6, 2012

(65) Prior Publication Data
US 2014/0110880 A1  Apr. 24, 2014

Related U.S. Application Data

(60) Provisional application No. 61/549,809, filed on Oct. 21, 2011, provisional application No. 61/491,361, filed on May 31, 2011.

(51) Int. Cl.
| C08L 67/04 | (2006.01) |
| C08L 51/06 | (2006.01) |
| C08L 53/00 | (2006.01) |
| C08L 91/06 | (2006.01) |
| C08L 91/00 | (2006.01) |
| C08L 53/02 | (2006.01) |

(52) U.S. Cl.
CPC .............. *C08L 53/00* (2013.01); *C08L 51/06* (2013.01); *C08L 53/025* (2013.01); *C08L 67/04* (2013.01); *C08L 91/00* (2013.01); *C08L 91/06* (2013.01)

(58) Field of Classification Search
CPC ......... C08L 91/06; C08L 91/00; C08L 53/02; C08L 53/025; C08L 67/04; C08L 51/06; C08L 53/00

USPC .......... 264/230; 524/504, 505, 578, 489, 487; 525/64

See application file for complete search history.

(56) References Cited

U.S. PATENT DOCUMENTS

| 5,262,468 A | 11/1993 | Chen |
| 5,508,334 A | 4/1996 | Chen |
| 6,121,384 A | 9/2000 | Rajagopalan |
| 6,469,105 B1 | 10/2002 | Rajagopalan |
| 6,531,160 B2 | 3/2003 | Biatry et al. |
| 7,977,397 B2 | 7/2011 | Cheung et al. |
| 2007/0244550 A1 | 10/2007 | Eidenschink |
| 2008/0132988 A1 | 6/2008 | Jordan |
| 2009/0105691 A1 | 4/2009 | Sung |
| 2009/0131557 A1 | 5/2009 | Uyama et al. |

FOREIGN PATENT DOCUMENTS

| CN | 101260220 A | 9/2008 |
| FR | 2799199 A1 | 4/2001 |

OTHER PUBLICATIONS

Zhang et al., "A novel type of shape memory polymer blend and the shape memory mechanism," Polymer, 50(6), 1596-1601 (2009).*
Song et al., "A New Strategy to Prepare Polymer-based Shape Memory Elastomers," Macromol. Rapid Commun., 32(19), 1569-1575 (first published online Jul. 26, 2011).*

* cited by examiner

*Primary Examiner* — Susannah Chung
*Assistant Examiner* — Josephine Chang
(74) *Attorney, Agent, or Firm* — Michael J. Sambrook; John H. Hornickel

(57) ABSTRACT

A thermoplastic elastomer compound is disclosed having a high strain recovery rate and a high strain fixity rate to provide shape memory, preferably manageable shape memory. One type of thermoplastic elastomer compound is comprises a maleated styrenic block copolymer and polycaprolactone to achieve the shape memory. A second type of thermoplastic elastomer compound comprises styrene-ethylene/butylene-styrene and a paraffin wax having less than about 0.5% oil content. Shape modes of articles made from the thermoplastic elastomer compound can be altered by at least one thermo-mechanical event to cause deformation of the compound from a first shape to a second shape with retention of the compound in the second shape for any reasonable time interval.

9 Claims, No Drawings

THERMOPLASTIC ELASTOMER COMPOUNDS EXHIBITING SHAPE MEMORY VIA THERMO-MECHANICAL ACTION

CLAIMS OF PRIORITY

This application claims priority from U.S. Provisional Patent Application Ser. No. 61/491,361 filed on May 31, 2011 and from U.S. Provisional Patent Application Ser. No. 61/549,809 filed on Oct. 21, 2011, both of which are incorporated by reference.

FIELD OF THE INVENTION

This invention relates to thermoplastic elastomers containing a thermo-induced shape memory, that is, an ability to both retain an altered shape via thermo-mechanical action and an ability to restore to an original shape after altered shape also via thermo-mechanical action.

BACKGROUND OF THE INVENTION

The world of polymers has progressed rapidly to transform material science from wood and metals of the $19^{th}$ Century to the use of thermoset polymers of the mid-$20^{th}$ Century to the use of thermoplastic polymers of later $20^{th}$ Century.

Thermoplastic elastomers (TPEs) combine the benefits of elastomeric properties of thermoset polymers, such as vulcanized rubber, with the processing properties of thermoplastic polymers. Therefore, TPEs are preferred because they can be made into articles using injection molding equipment.

The world of polymers also has explored "shape memory effect," an ability of the polymer in one shape to be deformed to another shape non-permanently and then later having the ability to be restored to the original shape.

Polymers with a shape memory effect are multiphase polymers with a well engineered morphology. Such shape memory polymers can be polyethylene crosslinked by ionizing radiation for making a heat shrinking film or polyurethane block copolymers for medical applications. These types of polymers having shape memory effect have a Shore A hardness of at least about 70.

Blends of polymers, none of which themselves have shape memory effect, do not conventionally achieve a shape memory effect because of the lack of covalent bonds between different phases of the blended polymers, in order to control the network morphology.

SUMMARY OF THE INVENTION

What the art needs is a new formulation of thermoplastic elastomer compounds (TPEs) that have "shape memory." The TPE compounds of the present invention have "manageable shape memory."

"TPEs" or "TPE compounds" for this invention means a blend of more than one polymer, at least one of which is a thermoplastic elastomer, in which none of the polymers has its own shape memory effect. One benefit of blends is an ability to easily adjust processability and physical properties of the compound, unlike individual polymers having limited processing and performance ranges based on their morphology and rheology.

Shape memory effect does not have a single definition or a single standardized test method. Therefore, for this invention description, specific definitions and a specifically devised experimental test are used to describe the invention with clarity.

"Shape memory" for TPEs of the present invention means the TPE can have an ability to both retain an altered shape via thermo-mechanical action and an ability to restore to an original shape after altered shape also via thermo-mechanical action.

A newly devised experimental test is used to explain the TPEs of the present invention using the terminology of "strain recovery rate" and "strain fixity rate." Both rates are based on a ratio of stress and strain measurements. There are four measurements made:

D1, which measures the original or "baseline" distance (or shape mode) before reshaping occurs;

D2, which measures a first thermo-mechanically induced or "programmed heated" distance (or shape mode) as the first reshaping event;

D3, which measures a second thermo-mechanically induced or "programmed cooled" distance (or shape mode) as the second reshaping event; and D4, which measures a third thermo-mechanically induced or "final" distance (or shape mode) as the third reshaping event.

Based on these four measurements of D1-D4, a "strain recovery rate" is $$Rr=(D2-D4)/(D2-D1)$$

Stated alternatively, the strain recovery rate is the ratio of the difference of the programmed heated distance and final distance, divided by the difference of the programmed heated distance and the baseline distance. By either means of expression, one can see that ideal recovery is that circumstance where D4, the final distance, equals the D1, the baseline distance. Because the TPE undergoes two different heat and cool cycles under mechanical stress, any high strain recovery rate above 0.65 is acceptable, above 0.80 being desirable, and above 0.90 being truly exceptional. In that context, "high" means at least 0.65 or 65%; desirably at least 0.80 or 80%; and preferably at least 0.90 or 90%.

Also based on the four measurements of D1-D4, a "strain fixity rate" is $$Rf=(D3-D1)/(D2-D1)$$

Stated alternatively, the strain fixity rate is the ratio of the difference of the programmed cooled distance and baseline distance, divided by the difference of the programmed heated distance and the baseline distance. By either means of expression, one can see that ideal recovery is that circumstance where D3, the programmed heated distance, equals the D2, the programmed cooled distance. Because the TPE undergoes two different heat and cool cycles under mechanical stress, any high strain fixity rate above 0.65 is acceptable, above 0.80 being desirable, and above 0.90 being truly exceptional. In that context, "high" means at least 0.65 or 65%; desirably at least 0.80 or 80%; and preferably at least 0.90 or 90%.

Therefore, a TPE compound of the present invention having "shape memory" is defined to be a TPE having both a "high" "strain recovery rate" and a "high" "strain fixity rate" of at least 65%, desirably at least 80%, and preferably at least 90%.

Moreover, the TPEs of the present invention have "manageable shape memory" in that the shape alteration of the TPE can be halted after the programmed heated shape, the first thermo-mechanical event; or can be halted after the programmed cooled shape, the second thermo-mechanical event; or can be concluded with the final shape, the third thermomechanical event. This "manageable shape memory" is based on which is the ultimate shape memory desired for the article made of the TPE compound.

In the world of polymer physics, only the concept of compression set, identified by ASTM D395 to be permanent deformation remaining after release of a compressive stress, approaches the concept of "shape memory". Yet compression set is not "manageable shape memory" as defined herein because compression set represents a permanent deformation, not a temporary deformation which "manageable shape memory" connotes.

One aspect of the present invention is a thermoplastic elastomer compound comprising at least one thermoplastic elastomer and at least one other polymer, neither of which having a shape memory but together as a blend having a shape memory as defined above. Preferably, that shape memory is manageable.

Another aspect of the present invention is a thermoplastic elastomer compound having a strain recovery rate of at least 65%.

Another aspect of the present invention is a thermoplastic elastomer compound having a strain fixity rate of at least 65%.

Another aspect of the present invention is a thermoplastic elastomer compound comprising (a) a maleated styrenic block copolymer and (b) polycaprolactone, wherein the thermoplastic elastomer compound has shape memory, preferably manageable shape memory.

Another aspect of the present invention is a thermoplastic elastomer compound comprising (a) styrene-ethylene/butylene-styrene block copolymer and (b) paraffin wax having less than about 0.5 weight percent oil content, wherein the thermoplastic elastomer compound has shape memory, preferably manageable shape memory.

Another aspect of the present invention is an article made of the thermoplastic elastomer compounds identified above, in which the article has been reshaped by at least one thermo-mechanical event.

"Thermo-mechanical event" for these purposes means alteration of temperature by at least 40° C. under sufficient stress to cause deformation of the article from a first shape to a second shape with retention of the TPE of that second shape for any time interval.

It has been found that retained shape in the programmed heated shape mode after the baseline shape mode can have a time interval of at least two days, desirably at least 30 days, and preferably at least 60 days. Likewise, it has been found that retained shape in the programmed cooled shape mode after the programmed heated shape mode can have a time interval of at least 7 days, desirably at least 30 days, and preferably at least 60 days. Finally, it has been found that the retained shape in the final shape mode after the programmed cooled shape mode can have a time interval of at least two days, desirably at least 30 days, and preferably at least 60 days.

Features of the invention will become apparent with reference to the following embodiments.

EMBODIMENTS OF THE INVENTION

Styrenic Block Copolymer

Styrenic block copolymers (SBCs) are well known thermoplastic elastomer materials. The elastomeric midblock, flanked by styrenic end blocks, can be isoprene (SIS), isobutylene (SIBS), butylene (SBS), ethylene/butylene (SEBS), ethylene-propylene (SEPS), and ethylene-ethylene/propylene (SEEPS), etc. Any SBC can be a potential candidate for use in the present invention as the thermoplastic elastomer component which itself has no shape memory.

Preferably, the SBCs can be grafted with maleic anhydride, to make a maleated SBC. Any maleated SBC can be a potential candidate for use in the present invention.

Of the possible SBC candidates and among them, the possible maleated SBC candidates, maleic anhydride-grafted polystyrene-poly(ethylene-butylene)-polystyrene triblock copolymers ("maleated SEBS") is the presently preferred thermoplastic elastomer for one embodiment of the invention.

Maleated SEBS is commercially available from Kraton Polymers as Kraton G1901, G1924, and MD-6684CS grades. Of these grades of maleated SEBS, MD-6684CS is presently preferred because MD-6684CS polymer is a clear, linear high molecular weight, functionalized tri-block copolymer based on styrene and ethylene/butylene, which exhibits excellent flow and compatibility with polyolefins, together with desirable adhesion on polar surfaces, and superior performance at high temperature. The maleation level for MD-6684CS is about 1 weight percent while the styrene content is about 32 weight percent.

Unlike grades G1901 or G1924, grade MD-6684CS is a high molecular weight TPE. Kraton MD6684CS grade has a weight average molecular weight of about 250,000. Therefore, for purposes of this invention, "high molecular weight" for maleated SEBS means a weight average molecular weight of at least about 200,000. Desirably, the "high molecular weight" is at least about 225,000, and preferably at least about 250,000.

The recent commercialization of this high molecular weight maleated SEBS (Kraton MD6684CS) has made it possible for the industry create TPE compounds with improved compression set values at the same elevated temperatures (typically <40% at 70° C. and <65% at 100° C.).

Of the possible SBC candidates, polystyrene-poly(ethylene-butylene)-polystyrene triblock copolymers ("SEBS") is the presently preferred thermoplastic elastomer for a second embodiment of the invention. Kraton G1651 SEBS is a very popular SBC and well suited for use in the invention.

Polycaprolactone

In the first embodiment, the second ingredient in the compound is polycaprolactone, which itself has no shape memory. Polycaprolactone (PCL) is a biodegradable polyester with a low melting point of around 60° C. and a glass transition temperature of about −60° C. PCL is prepared by ring opening polymerization of c-caprolactone using a catalyst such as stannous octoate. The most common use of polycaprolactone is in the manufacture of specialty polyurethanes. Polycaprolactones impart good water, oil, solvent and chlorine resistance to the polyurethane produced. This polymer is also often used as an additive for resins to improve their processing characteristics and their end use properties (e.g., impact resistance).

Polycaprolactone useful in the present invention can have a weight average molecular weight ranging from about 10,000 to about 80,000 and preferably from about 30,000 to about 60,000; a melt flow rate ranging from about 100 to about 1 and preferably from about 50 to about 5; and a melting point temperature ranging from about 45 to about 65 and preferably from about 55 to about 60.

Low Oil Content Paraffin Wax

In the second embodiment of the invention, a paraffin wax is the second ingredient, which also has no shape memory. Presently preferred paraffin waxes are those with low oil content, less than about 0.5% and preferably less than about 0.3% as measured using ASTM D721.

Of commercially available waxes, Sasolwax brand paraffin waxes are acceptable with grade R4250 being presently preferred. This grade R4250 has a melting temperature ranging about 147-151° F. as measured using ASTM D87 (and preferably 150° F.), a Saybolt color of about +25 minimum measured using ASTM D156 (and preferably +27 minimum), a Needle Penetration at 77° F. of 13 measured using ASTM D1321, a viscosity at 212° F. of about 5.5 centiStokes (cSt) measured using ASTM D445, and a Flash Point, COC of greater than 465° F. measured using ASTM D92. Grade R4250 is compliant with the USA Food and Drug Administration regulations, listed at 21 CFR §172.886 and 21CFR §178.3710. In North America, Sasol Wax is located in Hayward, Calif.

Plasticizer

A plasticizer is useful. For TPE compounds of the present invention, the plasticizer can be mineral oil.

Polyolefins as a Secondary Polymer

In the present invention, the TPE compound includes polyethylene or polypropylene or both to contribute processability to the TPE compound. Of the olefins, high density polyethylene (HDPE) and/or polypropylene (PP) are preferred. Those olefins are commercially available from a number of sources.

Other Optional Additives

The compound of the present invention can include other conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-oxidants; anti-static agents; blowing or foaming agents; dispersants; fillers and extenders; fire and flame retardants and smoke suppressants; impact modifiers; initiators; lubricants; micas; pigments, colorants and dyes; oils and plasticizers; processing aids; release agents; silanes, titanates and zirconates; slip and antiblocking agents; stabilizers; stearates; ultraviolet light absorbers; viscosity regulators; waxes; and combinations of them. Of these optional additives, waxes, phenolic stabilizers, and phosphite antioxidants are often used.

Table 1 shows the acceptable and desirable ranges of ingredients for the TPE of the first embodiment of the present invention. The compound can comprise, consist essentially of, or consist of the following ingredients.

TABLE 1

Ranges of Ingredients

| Ingredient (Wt. Percent) | Acceptable | Desirable |
|---|---|---|
| Maleated SBC | 20-40 | 20-30 |
| Polycaprolactone | 5-35 | 25-30 |
| Plasticizer | 35-55 | 40-45 |
| Polyolefin | 2-5 | 3-4 |
| Phenolic anti-oxidant | 0-0.2 | 0.1-0.2 |
| Phosphite Stabilizer | 0-0.2 | 0.1-0.2 |

TABLE 1-continued

Ranges of Ingredients

| Ingredient (Wt. Percent) | Acceptable | Desirable |
|---|---|---|
| Wax | 0-0.3 | 0.1-0.3 |
| Other Optional Additives | 0-10 | 1-5 |

Table 2 shows the acceptable and desirable ranges of ingredients for the TPE of the second embodiment of the present invention. The compound can comprise, consist essentially of, or consist of the following ingredients.

TABLE 2

Ranges of Ingredients

| Ingredient (Wt. Percent) | Acceptable | Desirable |
|---|---|---|
| SEBS | 40-50 | 43-48 |
| Paraffin Wax of Low Oil Content (<0.5%) | 5-40 | 30-40 |
| Plasticizer | 10-40 | 10-20 |
| Polyolefin | 4-10 | 6-8 |
| Phenolic anti-oxidant | 0-0.4 | 0.1-0.3 |
| Phosphite Stabilizer | 0-0.4 | 0.1-0.3 |
| Other Optional Additives | 0-10 | 1-5 |

Processing

The preparation of compounds of the present invention is uncomplicated. The compound of the present can be made in batch or continuous operations.

Mixing in a continuous process typically occurs in an extruder that is elevated to a temperature that is sufficient to melt the polymer matrix with addition at the head of the extruder. Extruder speeds can range from about 50 to about 500 revolutions per minute (rpm), and preferably from about 300 to about 500 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

Usefulness of the Invention

TPE compounds of the present invention with shape memory, especially manageable shape memory, can prove useful in a myriad of ways. The fact that articles of the TPE compound can be altered to a different shape mode or more than one different shape modes sequentially, over any determined time interval between shape alterations opens TPE compounds to an entirely new category of goods.

Manageable shape memory allows time-sequenced manipulation of articles of the invention in a binary environment of "on/off" or "stretched/compressed" or "tensioned/relieved", etc. A sphere of three dimensions can be altered to a pancake of essentially two dimensions for a moment or a month.

In that respect, the manageable shape memory can expand or contract one dimension of the article or more than dimension of the article. A simple alteration would be stretching from a non-stretched position, for any duration determined without undue experimentation, followed by a return to the non-stretched position. A complex alteration would be sequentially or concurrently stretching in two dimensions from a non-stretched position, followed by a return to the non-stretched dimension or dimensions at a later, controlled time.

Similar to the use of films as oriented or even biaxially oriented films, TPE-based articles of this invention can become oriented, biaxially oriented, or triaxially oriented for an interval of any pre-determined or event-caused duration, except that because of their shape memory, these TPE-based articles can return to their baseline shape mode, or nearly so.

Shape memory manipulation can be useful in toys and games, insulation, controlled dampening objects, furniture cushions, automobiles, industrial tools, medical devices, mattresses, packaging, consumer products, and other objects benefitting from the binary or ternary nature of the manageable shape memory and having a Shore A hardness of less about 60 and desirably less than about 40.

EXAMPLES

Table 3 shows the ingredients for Examples 1-3, the first embodiment of the invention, and Comparative Examples A-B and the property test results.

All of Examples 1-3 and A-B were made using a twin-screw extruder set at 160° C. in 1-3 zones; 190° C. in 7-12 zones, rotating at 400 rpm. All ingredients were added before Zone 1.

Pellets of all Examples 1-3 and A-B were molded into tensile test bars using a Boy injection molding machine, operating at 190° C. temperature and high pressure.

Conventional physical tests were performed using the ASTM methods listed.

The Thermo-Mechanical Tests performed used the following steps:

1. Pellets were injection molded into plaques with the length of 152 mm, width of 127 mm and thickness of 1.8 mm.
2. Specimens were then cut out from the plaques with the length of 38 mm, width of 2.5 mm and thickness of 1.8 mm.
3. The specimens were then marked the specimen with an exact distance of 25.4 mm (D1 or baseline shape mode) between the two marks while the specimens were at a temperature of 25° C.
4. The specimens were then immersed in water at a temperature of 70° C. for 10 seconds, then taken out of the water and immediately stretched to an exact distance of 50.8 mm (D2 or programmed heat shape mode) between the marks.
5. The specimens were then maintained at the stretched distance at 50.8 mm and immersed in 25° C. water for 10 seconds.
6. The specimens were then removed from the 25° C. water without any applied stress on the specimens and allowed to sit at 25° C. for 30 seconds, whereupon the specimens were measured for the distance between the original marks (D3 or programmed cooled shape mode).
7. The specimens were then immersed again in 70° C. water for 10 seconds and then removed and naturally cooled to 25° C. and measured for the distance between the original marks (D4 or final shape mode).
8. The equation Strain $\epsilon m = (D2-D1)/D1$ was used to calculate the strain
9. The equation Strain recovery rate $Rr = (D2-D4)/(D2-D1)$ was used to calculate the strain recovery rate.
10. The equation Strain fixity rate $Rf = (D3-D1)/(D2-D1)$ was used to calculate the strain fixity rate.

A material with a "shape memory" effect shows both "high" "strain recovery rate" and "high" "strain fixity rate" as all four words and phrases are defined above in the Summary of Invention section of the document.

TABLE 3

| Ingredient Name | Generic Chemistry | Source | Comp. A Wt. % | Comp. B Wt. % | 1 Wt. % | 2 Wt. % | 3 Wt. % |
|---|---|---|---|---|---|---|---|
| Kraton MD 6684 | Maleated Styrene ethylene-butylene copolymer | Kraton Polymers | | 35.51 | 32.09 | 28.44 | 24.90 |
| Puretol PSO 380 | Mineral oil | Petro Canada | | 58.58 | 52.94 | 46.92 | 41.08 |
| CAPA 6500 | Polycaprolactone | Perstorp | 100.00 | 0.00 | 9.63 | 19.91 | 29.88 |
| Atofina 3860X | Polypropylene | Total Petrochemicals | | 5.33 | 4.81 | 4.27 | 3.73 |
| Irganox 1010 | Hindered phenol type antioxidant | BASF (formerly Ciba) | | 0.18 | 0.16 | 0.14 | 0.12 |
| Irgafos 168 | trisarylphosphite processing stabilizer | BASF (formerly Ciba) | | 0.18 | 0.16 | 0.14 | 0.12 |
| Kemamide E Ultra | Erucamide | Chemtura | | 0.23 | 0.21 | 0.18 | 0.16 |
| | | | 100.00 | 100.00 | 100.00 | 100.00 | 100.00 |
| | | | Physical Properties | | | | |
| | Shore A Hardness (ASTM D2240, 10 s delay) | | 53 | 18 (Shore D) | 22 | 33 | 55 |
| | Specific gravity (ASTM D792) | | 1.12 | 0.89 | 0.91 | 0.93 | 0.95 |
| | Tensile Strength, psi (ASTM D412, Die C) | | 1050 | 155 | 155 | 218 | 468 |
| | Elongation, % (ASTM D412, Die C) | | 860 | 708 | 498 | 483 | 264 |

TABLE 3-continued

| Ingredient Name | Generic Chemistry | Source | Comp. A Wt. % | Comp. B Wt. % | 1 Wt. % | 2 Wt. % | 3 Wt. % |
|---|---|---|---|---|---|---|---|
| | | Thermo-Mechanical Test | | | | | |
| | Strain $\epsilon_m$, % | | 100 | 100 | 100 | 100 | 100 |
| | Strain recovery rate Rr, % | | 4 | 100 | 83 | 98 | 97 |
| | Strain fixity rate Rf, % | | 100 | 6 | 69 | 75 | 99 |

Comparative Example A was a control of 100% polycaprolactone, a very hard, dense material having a very low strain recovery rate and hence no shape memory itself. Comparative Example B is a TPE compound with all ingredients of Examples 1-3, except for the absence of all polycaprolactone. Comparative Example B was a very soft, light compound having a very low strain fixity rate and hence no shape memory itself.

Examples 1-3 include the polycaprolactone missing from Comparative Example B, with amounts increasing from about 10% to about 20% to about 30%. All three Examples 1-3 have acceptable shape memory, with the 30% Example 3 having truly exceptional, almost perfect shape memory of both very high strain recovery rate and very high strain fixity rate.

The physical properties of Examples 1-3 are also acceptable for use in commercial products requiring the hardness of typical thermoplastic elastomer compounds, such as below about 60 Shore A hardness. None of the conventional individual, unblended polymers is known to have a Shore A hardness of less than about 70.

As stated at the beginning, thermoplastic elastomers have all of the benefits of thermoplastic processing with elastomeric performance. TPE compounds of the present invention, blends of at least one thermoplastic elastomer and at least one other polymer, have broken through in the matter of elastomeric performance by establishing manageable shape memory which can be controlled by the user or another causation event to change from one shape mode to another via thermo-mechanical action. Together, the thermoplastic elastomer and the polymer have shape memory, even though individually, neither does.

Table 4 shows the ingredients for Examples 4-7, the second embodiment of the invention, and Comparative Example C and the property test results.

All of Examples 4-7 and C were made using a twin-screw extruder set at 160° C. in 1-3 zones; 190° C. in 7-12 zones, rotating at 500 rpm. All ingredients were added before Zone 1.

Pellets of all Examples 4-7 and C were molded into tensile test bars using a Boy injection molding machine, operating at 190° C. temperature and high pressure.

Conventional physical tests were performed using the ASTM methods listed. The thermomechanical tests were performed in the same manner as for Examples 1-3 and Comparative Examples A and B above.

TABLE 4

| Ingredient Name | Generic Chemistry | Source | Comp. C Wt. % | 4 Wt. % | 5 Wt. % | 6 Wt. % | 7 Wt. % |
|---|---|---|---|---|---|---|---|
| Kraton G1651 SEBS | Styrene-ethylene/butylene-styrene elastomer | Kraton | 46.4 | 46.3 | 46.3 | 46.3 | 46.3 |
| Sasolwax R4250 | Paraffin wax | Sasol, Ltd. - Hamburg, Germany | 0.0 | 6.9 | 11.6 | 23.1 | 34.7 |
| Puretol PSO 380 | Mineral oil | Petro Canada | 46.4 | 39.4 | 34.7 | 23.1 | 11.6 |
| Profax PD702 | Polypropylene | LyondellBasell Industries | 7.0 | 6.9 | 6.9 | 6.9 | 6.9 |
| Irganox 1010 | Hindered phenol type antioxidant | BASF, formerly Ciba | 0.1 | 0.2 | 0.2 | 0.2 | 0.2 |
| Irgafos 168 | trisarylphosphite processing stabilizer | BASF, formerly Ciba | 0.1 | 0.2 | 0.2 | 0.2 | 0.2 |
| | | | 100.0 | 100.0 | 100.0 | 100.0 | 100.0 |
| | | Physical Properties | | | | | |
| | Shore A Hardness (ASTM D2240, 10 s delay) | | 34 | 52 | 54 | 73 | 72 |
| | Specific gravity (ASTM D792) | | 0.87 | 0.87 | 0.89 | 0.88 | 0.88 |
| | Tensile Strength, psi (ASTM D412, Die C) | | 411 | 549 | 395 | 781 | 516 |
| | Elongation, % (ASTM D412, Die C) | | 501 | 564 | 851 | 600 | 689 |
| | | Thermo-Mechanical Test | | | | | |
| | Strain $\epsilon_m$, % | | 100 | 100 | 100 | 100 | 100 |
| | Strain recovery rate Rr, % | | 98 | 92 | 96 | 93 | 100 |
| | Strain fixity rate Rf, % | | 14 | 100 | 100 | 100 | 100 |

The thermomechanical test results were startling. Comparative Example C, with SEBS but no low oil content paraffin wax, failed the strain fixity rate test and hence no shape memory. Certainly a formulation without SEBS but with low oil content paraffin wax would fail the strain recovery test because above about 60° C., the paraffin wax is in a liquid form, also resulting in a compound with no shape memory. But beginning with Example 4, the increasing presence of the low oil content paraffin wax resulted in marvelous shape memory results, including manageable shape memory.

The second embodiment of Examples 4-7 all had acceptable physical properties and also had better shape memory results than the first embodiment of Examples 1-3. All of Examples 4-7 had greater than 90% of both strain recovery rate and strain fixity rate. Example 7, which comprised 75 parts of low oil content paraffin wax to 100 parts of SEBS, had as perfect a shape memory result as could be measured.

The second embodiment also benefits from the lower costs of the starting ingredients and the prior qualification of the ingredients on the USA Food and Drug Administration's Generally Recognized As Safe (GRAS) list.

This invention is not limited to the above embodiments. The claims follow.

What is claimed is:

1. A thermoplastic elastomer compound comprising:
   (a) from about 43 to about 48 weight percent, by weight of the thermoplastic elastomer compound, of at least one thermoplastic elastomer selected from styrene-ethylene/butylene-styrene block copolymer;
   (b) from about 5 to about 40 weight percent, by weight of the thermoplastic elastomer compound, of at least one other material selected from paraffin wax having less than about 0.5 percent oil content according to ASTM D721 and a melting temperature ranging from 147 to 151° F. (63.9 to 66.1° C.) according to ASTM D87;
   (c) from about 10 to about 40 weight percent, by weight of the thermoplastic elastomer compound, of mineral oil; and
   (d) from about 4 to about 10 weight percent, by weight of the thermoplastic elastomer compound, of polyolefin;
   wherein the thermoplastic elastomer compound has shape memory.

2. The thermoplastic elastomer compound of claim 1, wherein the thermoplastic elastomer has a strain fixity rate of about 100%.

3. The thermoplastic elastomer compound of claim 1, wherein the paraffin wax has:
   a Saybolt color of at least about +25 according to ASTM D156;
   a Needle Penetration at 77° F. of about 13 according to ASTM D1321;
   a viscosity at 212° F. of about 5.5 centiStokes according to ASTM D445; and
   a Flash Point, COC of greater than 465° F. according to ASTM D92.

4. The thermoplastic elastomer compound claim 1 further comprising one or more additives selected from the group consisting of adhesion promoters; biocides; anti-fogging agents; anti-oxidants; anti-static agents; blowing agents; dispersants; extenders; fillers; flame retardants; foaming agents; smoke suppressants; impact modifiers; initiators; lubricants; micas; pigments; colorants; dyes; oils; processing aids; release agents; silanes; titanates; zirconates; slip agents; anti-blocking agents; stabilizers; stearates; ultraviolet light absorbers; viscosity regulators; and combinations of these additives.

5. The thermoplastic elastomer compound of claim 1, wherein the thermoplastic elastomer compound is in the form of extruded pellets.

6. An article molded from the thermoplastic elastomer compound of claim 1.

7. The article of claim 6, wherein the article is an injection molded article.

8. The article of claim 6, wherein the article has a Shore A hardness of less than about 60.

9. The article of claim 6, wherein the article has a strain fixity rate of about 100%.

* * * * *